US011366742B2

(12) United States Patent
Mahajan et al.

(10) Patent No.: US 11,366,742 B2
(45) Date of Patent: Jun. 21, 2022

(54) AUTOMATED IDENTIFICATION OF LINES OF CODE RELATED TO ERRORS FIELD

(71) Applicant: FUJITSU LIMITED, Kawasaki (JP)

(72) Inventors: Sonal Mahajan, Fremont, CA (US); Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/098,277

(22) Filed: Nov. 13, 2020

(65) Prior Publication Data

US 2022/0156174 A1    May 19, 2022

(51) Int. Cl.
*G06F 11/36*    (2006.01)

(52) U.S. Cl.
CPC ...... *G06F 11/3664* (2013.01); *G06F 11/3616* (2013.01)

(58) Field of Classification Search
None
See application file for complete search history.

(56) References Cited

U.S. PATENT DOCUMENTS

| 10,572,245 | B1* | 2/2020 | Doebel | G06F 8/65 |
| 10,649,833 | B1* | 5/2020 | Dutch | G06F 11/0709 |
| 10,705,943 | B2* | 7/2020 | Makkar | G06F 11/3684 |
| 2010/0070503 | A1* | 3/2010 | Abraham | G06Q 30/00 |
| | | | | 707/737 |
| 2016/0042275 | A1* | 2/2016 | Dettman | G06N 5/003 |
| | | | | 706/46 |
| 2019/0347149 | A1* | 11/2019 | Panigrahi | G06F 11/0793 |
| 2020/0019492 | A1* | 1/2020 | Fei | G06N 20/00 |
| 2020/0065220 | A1* | 2/2020 | Sobran | G06F 11/362 |
| 2020/0097512 | A1* | 3/2020 | Stelmar Netto | G06F 9/455 |
| 2020/0278842 | A1* | 9/2020 | Shihab | G06F 40/30 |
| 2020/0304435 | A1* | 9/2020 | Narendra | G06F 11/3438 |
| 2021/0019309 | A1* | 1/2021 | Yadav | G06F 16/245 |
| 2021/0081182 | A1* | 3/2021 | Seshadri | G06F 11/302 |

FOREIGN PATENT DOCUMENTS

WO    WO-2014099046 A1 *  6/2014  .......... G06F 11/0787

OTHER PUBLICATIONS

M. Motwani, M. Soto, Y. Brun, R. Just and C. Le Goues, "Quality of Automated Program Repair on Real-World Defects," in IEEE Transactions on Software Engineering, doi: 10.1109/TSE.2020.2998785. (Year: 2020).*

(Continued)

*Primary Examiner* — Andrew M. Lyons
(74) *Attorney, Agent, or Firm* — Maschoff Brennan (57) ABSTRACT

Operations may include obtaining a buggy code snippet from a question included in a post of a discussion forum, the buggy code snippet including an error and a plurality of lines of code. The operations may further include obtaining text from an answer to the question and identifying keywords from the text. In addition, the operations may include marking a particular line from the plurality of lines as being related to the error based on one or more of the keywords corresponding to one or more elements of the particular line. Moreover, the operations may include performing one or more software program repair operations based on the marking of the particular line.

20 Claims, 6 Drawing Sheets

(56) References Cited

OTHER PUBLICATIONS

R. Serva, Z. R. Senzer, L. Pollock and K. Vijay-Shanker, "Automatically Mining Negative Code Examples from Software Developer Q & A Forums," 2015 30th IEEE/ACM International Conference on Automated Software Engineering Workshop (ASEW), 2015, pp. 115-122, doi: 10.1109/ASEW.2015.10. (Year: 2015).*
Panthaplackel et al., "Associating Natural Language Comment and Source Code Entities" Feb. 7, 2020.
Howard et al., "Automatically Mining Software-Based, Semantically-Similar Words from Comment-Code Mappings" 2013.
Kim et al., "FaCoY—A Code-to-Code Search Engine" May 2018.
Zhang et al., "Analyzing and Supporting Adaptations of Online Code Examples" May 2019.
Ponzanelli et al., "Supporting Software Developers with a Holistic Recommender System" 2017.
Ponzanelli et al., "Mining StackOverflow to Turn the IDE into a Self-Confident Programming Prompter" 2014.
Liu et al., "Mining StackOverflow for Program Repair" 2018.
Sao et al., "Fixing Recurring Crash Bugs via Analyzing Q&A Sites" 2015.
Chen et al., "Crowd Debugging" 2015.
Yang et al., "From Query to Usable Code: An Analysis of Stack Overflow Code Snippets" 2016.
Terragniet et al., "CSNippex: Automated Synthesis of Compilable Code Snippets from Q&A Sites" 2016.
Subramanian et al., "Live API Documentation" 2014.
Subramanian et al., "Making Sense of Online Code Snippets" 2013.
Zhong et al., "Detecting API Documentation Errors" 2013.
Dagenais et al., "Recovering traceability links between an API and its learning resources" 2012.

* cited by examiner

AUTOMATED IDENTIFICATION OF LINES OF CODE RELATED TO ERRORS FIELD

FIELD

The embodiments discussed in the present disclosure are related to automated identification of lines of code that are related to errors.

BACKGROUND

Discussion forums, such as software developer forums, present a rich, hybrid knowledge base of natural language descriptions and code snippets related to developing software programs such as fixing errors (also referred to as bugs or errors) in the software programs. Software development tools may be configured to perform machine analysis operations to analyze posts of the forums to identify information related to correcting errors in other software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Operations may include obtaining a buggy code snippet from a question included in a post of a discussion forum, the buggy code snippet including an error and a plurality of lines of code. The operations may further include obtaining text from an answer to the question and identifying keywords from the text. In addition, the operations may include marking a particular line from the plurality of lines as being related to the error based on one or more of the keywords corresponding to one or more elements of the particular line. Moreover, the operations may include performing one or more software program repair operations based on the marking of the particular line.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of identifying lines of code that are related to errors (also referred to as bugs or violations) from posts of developer forums. In particular, a developer forum may include any discussion forums (e.g., online discussion forums) that may be used to discuss software programs and issues that may be present in software programs that are being developed. A user of the forums may post a question on a forum regarding how to correct an error that is found in a buggy snippet of code ("buggy snippet"). One or more other users may then post an answer on the forum that describes how to correct the error. Software development tools may be configured to analyze the question post and the corresponding answer posts to identify and generate software patches related to the same type of error included in the buggy snippet. However, the buggy snippet may include lines of code that are not related to the error included in the buggy snippet. These unrelated lines may lead to inefficiencies in identifying and/or generating patches. Further, the unrelated lines may result in the generated patches being less effective. In the present disclosure, reference to "related lines" of a buggy snippet may refer to lines that are related to the error of the buggy snippet. Further, reference to "unrelated lines" of a buggy snippet may refer to lines that are unrelated to the error of the buggy snippet. A line may be considered "related" to the error in response to the line contributing to the error in some way. Further, a line may be considered "unrelated" in response to the line not contributing to the error in any way.

According to one or more embodiments of the present disclosure, operations may be performed to extract a buggy snippet of a question post that may be posted on a developer forum. Additionally, operations may be performed to identify which lines of the buggy snippet may be relevant to the error of the buggy snippet. In particular, an answer post may include a description as to how to change the buggy snippet to correct the error included therein. The answer post may be written in natural language with code elements included therein. Further, the answer post may provide clues as to which lines of the buggy snippet are related to the error.

According to one or more embodiments, disclosed herein, natural language processing may accordingly be performed on one or more answer posts that correspond to a question post. The natural language processing may be used to identify text of the answer posts that indicates which lines of a buggy snippet of the question post are related to the corresponding error. In some embodiments, the buggy snippet may be annotated to indicate which lines are relevant to help facilitate understanding of the error and/or correction of the error. In these or other embodiments, the buggy snippet may be pruned to remove lines that are not identified or annotated as being related to the error. Additionally or alternatively, the pruned buggy snippet may be used to generate more effective software repairs than if the whole buggy snippet were used.

As such, according to one or more embodiments of the present disclosure, the technological field of software development may be improved by configuring a computer system in a manner in which the computing system is able to better identify portions of a buggy snippet that are related to a corresponding error. The computer system may also generate better patches to repair other errors that are similar to that of the buggy snippet by ignoring the lines of the buggy snippet that are not relevant to the error. Additionally or alternatively, the computer system may provide valuable information to developers by annotating the lines of the buggy snippet that are related to the error to help developers better understand causes of errors.

Embodiments of the present disclosure are explained with reference to the accompanying drawings.

Figure 1:
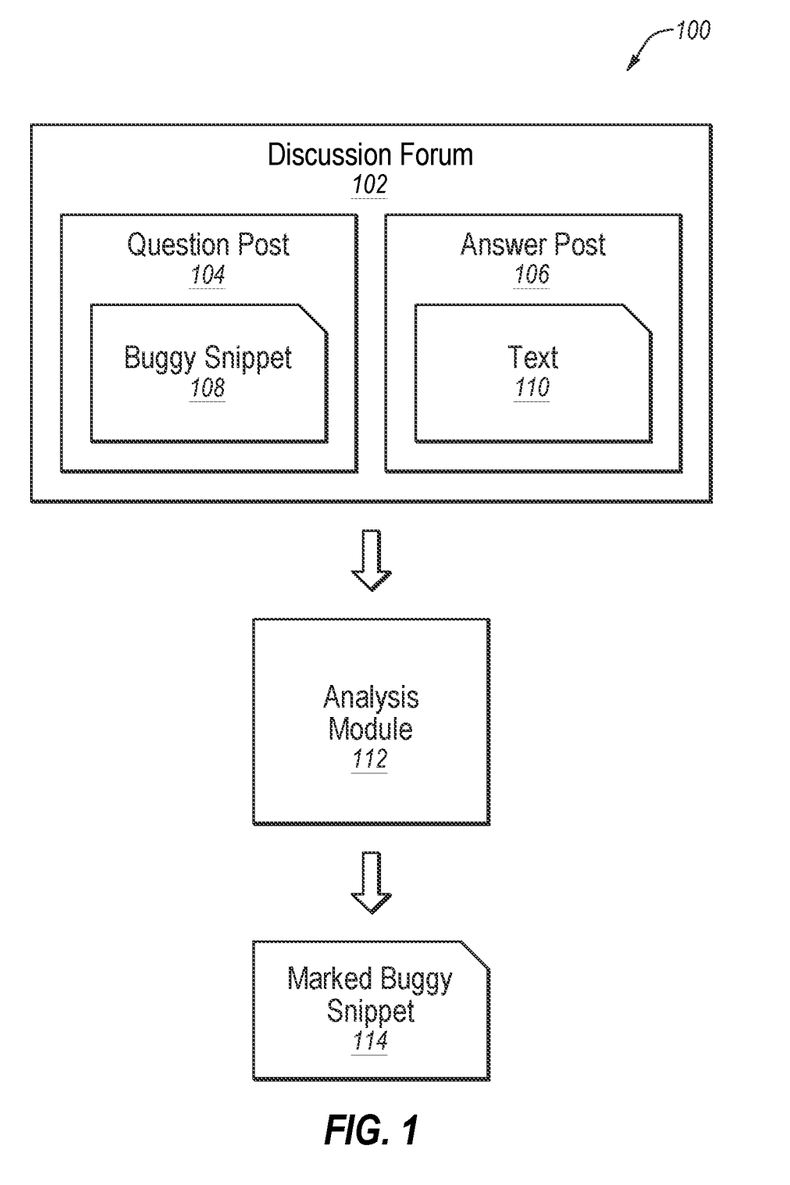
FIG. 1 is a diagram representing an example environment related to automated identification of lines of code that are related to errors.

FIG. 1 is a diagram representing an example environment 100 related to automated identification of lines of code of a buggy code snippet that are related to an error of the buggy code snippet. The environment 100 may be arranged in accordance with at least one embodiment described in the present disclosure. The environment 100 may include a developer forum 102 and an analysis module 112.

The developer forum 102 may include any applicable discussion forum that may be used by software program developers to exchange ideas. In some embodiments, the developer forum may be hosted on one or more websites, which may include any applicable website on the Internet. Alternatively or additionally, in some embodiments the websites may include an internal repository or resource, such as a collection of documents on an internal intranet site.

The developer forum 102 may be a forum where users may post questions and other users may post corresponding answers to the questions. For example, one user may post a question 104 ("question post 104") that may include a buggy code snippet 108 ("buggy snippet 108") of a software program. The buggy snippet 108 may include lines of code of a software program that includes an error and the question post 104 may ask for assistance in repairing the error. Additionally, another user may post an answer 106 ("answer post 106") that includes text 110 that describes how to correct the error of the buggy snippet 108. The text 110 may include text strings that include natural language (e.g., language used by humans) and/or code markup (e.g., text that is included in lines of code). As indicated above, in some instances, the buggy snippet 108 may include lines of code that are unrelated to the error and others that are related to the error. Further, the text 110 may provide information that indicates which lines of the buggy snippet may be related to the error.

The analysis module 112 may include code and routines configured to enable a computing system to perform one or more operations related to identifying related lines of the buggy snippet 108 from the text 110. Additionally or alternatively, the analysis module 112 may be implemented using hardware including a processor, a microprocessor (e.g., to perform or control performance of one or more operations), a field-programmable gate array (FPGA), or an application-specific integrated circuit (ASIC). In some other instances, the analysis module 112 may be implemented using a combination of hardware and software. In the present disclosure, operations described as being performed by the analysis module 112 may include operations that the analysis module 112 be configured to perform or configured to direct a corresponding system to perform.

The analysis module 112 may be configured to access the developer forum 102 and extract text from posts of the developer forum 102. For example, the analysis module 112 may be configured to obtain the buggy snippet 108 from the question post 104 and to obtain text 110 from the answer post. In some embodiments, the analysis module 112 may be communicatively coupled to any suitable network that may be used to access a website that hosts the developer forum 102 in order to obtain the text.

As discussed in further detail below, the analysis module 112 may be configured to identify keywords from the text 110. The keywords may include strings of characters that form words or phrases that are of a certain type that may correspond to elements of the buggy snippet 108. For example, certain parts of speech such as nouns and verbs of the text 110 may correspond to elements of the buggy snippet 108 more than other parts of speech. As such, in some embodiments, the keywords may include nouns, noun phrases, verbs, and/or verb phrases. Additionally or alternatively, text strings of the text 110 that are formatted according to code (referred to as "code markup") are also more likely to correspond to elements of the buggy snippet 108 than other types of text strings in the text 110. Therefore, in some embodiments, the keywords may include one or more text strings that are identified as "code markup."

In these or other embodiments, the analysis module 112 may be configured to determine whether one or more of the identified keywords corresponds to one or more elements of each of the lines of the buggy snippet 108. In response to a keyword corresponding to an element of a line, the analysis module 112 may identify the corresponding line as being related to the error of the buggy snippet 108. In these or other embodiments, the analysis module 112 may be configured to mark one or more of the identified related lines as such in the buggy snippet 108 to generate a marked buggy snippet 114. In some embodiments, the analysis module 112 may be configured to mark all of the related lines. Methods 300, 400, 500, and 600 discussed in further detail below with respect to FIGS. 3, 4, 5, and 6, respectively, provide examples of operations that may be performed by the analysis module 112 to generate the marked buggy snippet 114.

Modifications, additions, or omissions may be made to FIG. 1 without departing from the scope of the present disclosure. For example, the environment 100 may include more or fewer elements than those illustrated and described in the present disclosure.

Alternatively or additionally, in some embodiments, the analysis module 112 and the operations discussed relative to the analysis module 112 may be performed by a single device or distributed across different systems. Further, the analysis module 112, or another system or module, may be configured to perform one or more repair operations based on the marked buggy snippet 114, some example repair operations are discussed in further detail below with respect to FIG. 3

Figure 2:
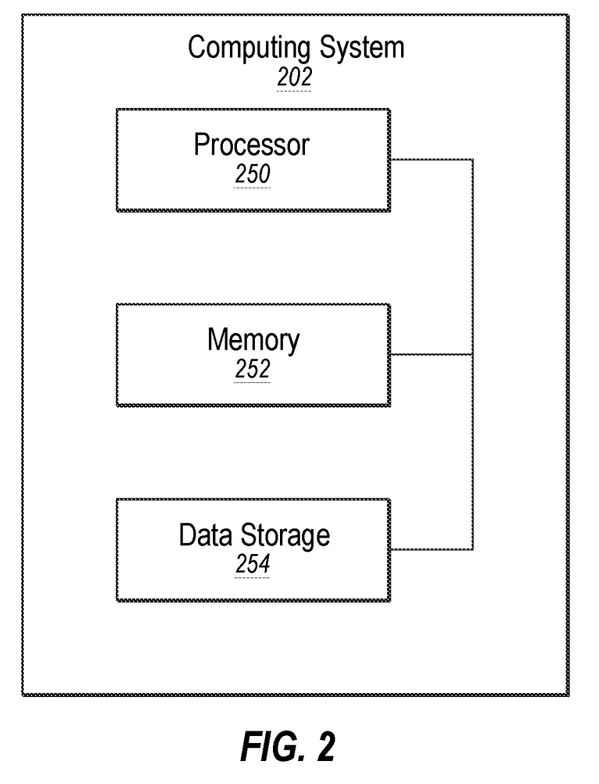
FIG. 2 illustrates a block diagram of an example computing system that may be used to identify code lines related to errors.

FIG. 2 illustrates a block diagram of an example computing system 202 that may be used to generate software patches, according to at least one embodiment of the present disclosure. The computing system 202 may be configured to implement or direct one or more operations associated with the analysis module 112 of FIG. 1, in some embodiments. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a module configured to identify related lines of a buggy code snippet (e.g., the analysis module 112 of FIG. 1) may be included in the data storage 254 as program instructions. The processor 250 may fetch the program instructions of the module from the data storage 254 and may load the program instructions of the module in the memory 252. After the program instructions of the module are loaded into memory 252, the processor 250 may execute the program instructions such that the computing system may implement the operations associated with the module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
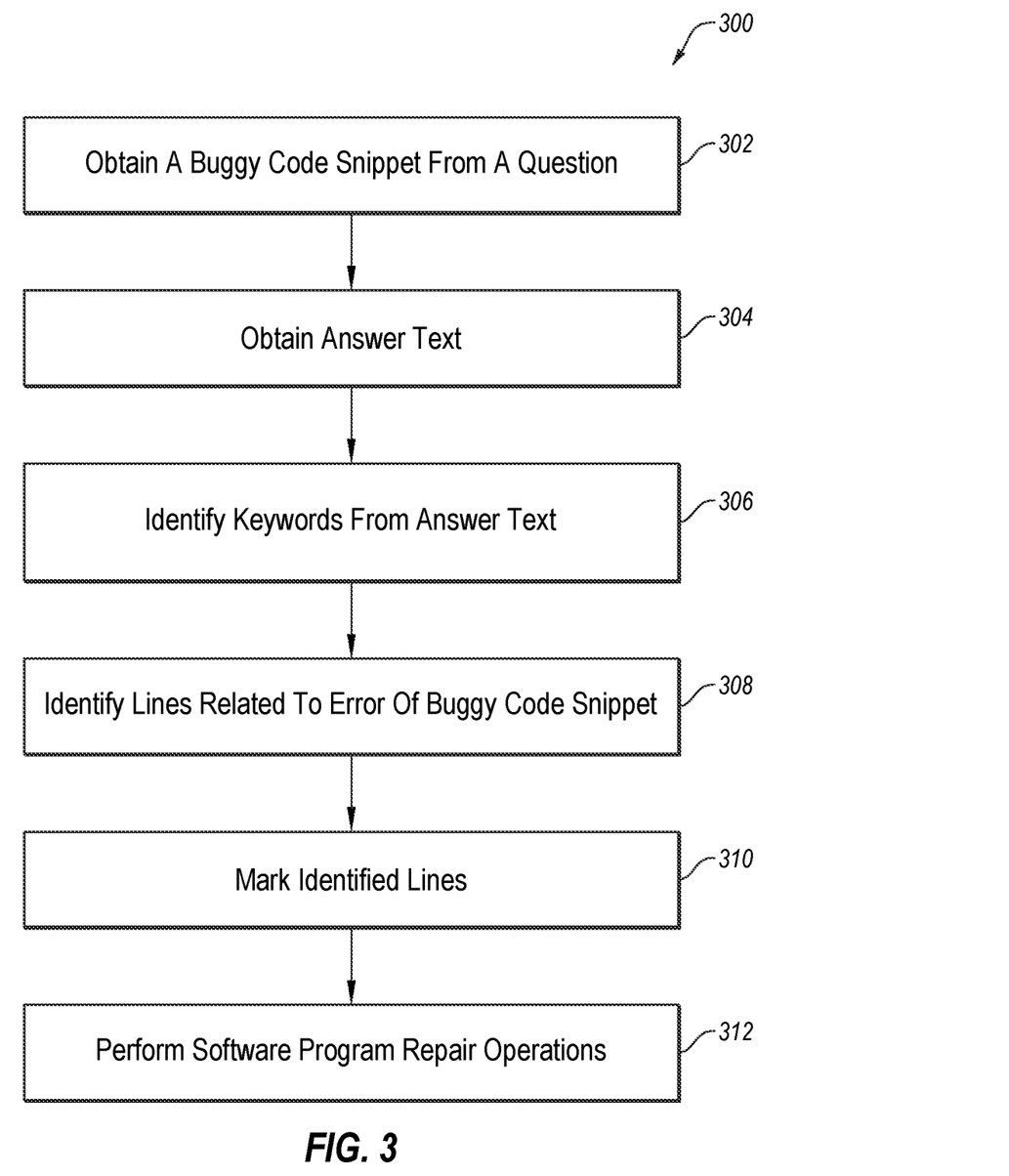
FIG. 3 is a flowchart of an example method of identifying code lines related to errors.

FIG. 3 is a flowchart of an example method 300 of identifying code lines related to errors, according to at least one embodiment described in the present disclosure. The method 300 may be performed by any suitable system, apparatus, or device. By way of example, the analysis module 112 of FIG. 1 or the computing system 202 of FIG. 2 (e.g., as directed by the analysis module in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a buggy code snippet ("buggy snippet") may be obtained. The buggy snippet may be obtained from a question post that may be posted on a developer forum such as the question post 104 of the developer forum 102 of FIG. 1. The buggy snippet may include an error. Further, the buggy snippet may include multiple lines of code in which one or more of the lines may be related to the error and/or one or more lines may be unrelated to the error.

At block 304, text from an answer to the question of the question post may be obtained. The text 110 of FIG. 1 is an example of the text that may be obtained.

At block 306, one or more keywords may be obtained from the text. As indicated above, the keywords may include strings of characters that form words or phrases that are of a certain type that may correspond to elements of the buggy snippet. For example, as described above, the keywords may include nouns, verbs, noun phrases, verb phrases, and/or code markup that may be included in the text. In some embodiments, the keywords may be obtained and/or identified by performing one or more operations described below with respect to the method 400 of FIG. 4.

At block 308, lines of the buggy snippet that are related to the error of the buggy snippet may be identified. In some embodiments, the related lines may be identified based on the keywords. For example, it may be determined whether one or more of the keywords corresponds to one or more elements of each of the lines of the buggy snippet. In response to a keyword corresponding to an element of a line, the corresponding line may be identified as being related to the error of the buggy snippet.

In some embodiments, the determination as to whether the keywords correspond to the one or more elements may include comparing the keywords against annotated lines of the buggy snippet. The lines may be annotated to indicate which elements of the lines relate to constructs of the lines and which elements relate to content of the lines. "Constructs" may include code elements that relate to and/or indicate what operation is being performed by the line. For example, constructs may include loops, etc. "Content" may include code elements that are used to perform the operations, such as method names etc. In some embodiments, the lines of the buggy snippet may be annotated by performing one or more operations described below with respect to the method 500 of FIG. 5. Additionally or alternatively, the related lines may be identified by performing one or more operations described below with respect to the method 600 of FIG. 6.

In some embodiments, the method 300 may include a block 310. At block 310, one or more of the lines of the buggy snippet identified at block 308 as being related to the error may be marked as being related to the error. In these or other embodiments, all of the lines identified at block 308 may be marked.

Additionally or alternatively, in some embodiments, the method 300 may include a block 312. At block 312, one or more software program repair operations may be performed based on the marked buggy snippet. For example, in some embodiments, the buggy snippet may be pruned to only include lines that have been identified as being related to the error. The pruned buggy snippet may then be used to generate a repair patch according to any suitable technique. Additionally or alternatively, the repair patch may be presented as a potential correction to an error of a software program under test in response to the error of the software program being the same as or similar to the error of the buggy snippet. In these or other embodiments, the repair patch may be implemented with the software program under test. Additionally or alternatively, the repair operations may include emphasizing the related lines in some manner that allows for users to identify the related lines in the buggy snippet. The emphasizing of the lines may allow the users to better focus on which portions of the buggy snippet caused the error to better identify how to correct and/or avoid the error in the future.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks. For example, in some embodiments, the method 300 may include one or more operations related to performing repair operations on the code under test based on the selected particular post. For instance, the particular example code snippet of the particular post may include a patch that may be applied to the buggy code snippet. Additionally or alternatively, the particular post may be presented to the developer of the code under test as a providing a potential solution to the particular error of the buggy code snippet.

Figure 4:
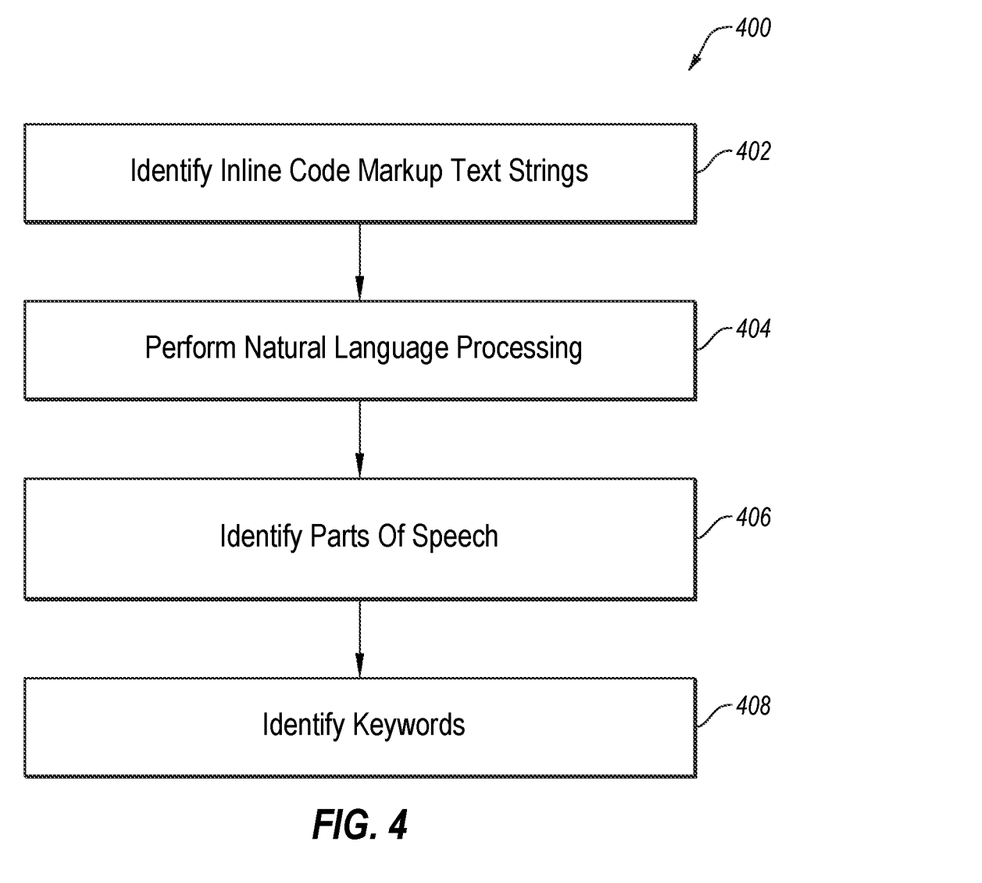
FIG. 4 is a flowchart of an example method of identifying keywords in text to help identify code lines related to errors.

FIG. 4 is a flowchart of an example method 400 of identifying keywords of answer text, according to at least one embodiment described in the present disclosure. The method 400 may be performed by any suitable system, apparatus, or device. By way of example, the analysis module 112 of FIG. 1 or the computing system 202 of FIG. 2 (e.g., as directed by the analysis module in some embodiments) may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation. In some embodiments, one or more of the operations of the method 400 may be performed with respect to block 306 of FIG. 3.

In general, the method 400 may be performed with respect to text of an answer ("answer text") to a question posted on a developer forum (e.g., the developer forum 102 of FIG. 1). The method 400 may be used to identify keywords withing the answer text that may be used to identify related lines of a buggy snippet of the question, such as described above.

At block 402, the answer text may be analyzed to identify inline code markup text strings ("code markup"). The code markup may include strings of text that are written or formatted in a manner that is typically found in source code of a software program. The identification of the code markup may be performed according to any suitable technique.

At block 404, natural language processing ("NLP") may be performed on the answer text. The NLP may modify the answer text in a manner that facilitates the identification of keywords from the answer text. The NLP may include any suitable NLP technique. For example, the NLP may include converting the text not identified as code markup (referred to as "remaining text") to lower case. In these or other embodiments, the NLP may include removing alphanumeric characters. Additionally or alternatively, the NLP may include removing "stopwords" from the answer text that may not point to programming constructs or content. For example, the stopwords may include prepositions, articles, pronouns, etc. In these or other embodiments, the NLP may include performing lemmatization, which may include normalizing the forms of the words. For example, verbs may be normalized into their infinitive forms. Additionally or alternatively, the NLP may include tokenizing the answer text, which may include identification of individual words in the answer text.

At block 406, parts of speech the remaining text may be identified. In some embodiments, the NLP may help facilitate identification of the parts of speech. For example, verbs, nouns, adjectives, adverbs, etc. may be identified. In some embodiments, the different words may be annotated with an indication of their respective parts of speech.

At block 408, one or more keywords may be identified from the answer text. As indicated above, the keywords may include code markup, nouns, or verbs. Therefore, in some embodiments, code markup identified at block 402 may be identified as respective keywords. Additionally or alternatively, words that are identified as nouns or verbs at block 408 may also be identified as respective keywords.

In some embodiments, the keywords may be extracted and saved. In these or other embodiments, the keywords may be annotated with their respective keyword type (e.g., annotated as "markup", "nouns", or "verbs"). Additionally or alternatively, the answer text may be annotated in which the identified keywords may be indicated as such. In these or other embodiments, the annotations may include the respective keyword types.

The method 400 may accordingly be used to determine a concrete patch from an example buggy code snippet and a corresponding repaired code snippet that corrects the error of the example bubby code snippet. Additionally or alternatively, the method 400 may use a bug pattern of a bug pattern library in determining the concrete patch.

One skilled in the art will appreciate that, for this and other processes, operations, and methods disclosed herein, the performance of the functions and/or operations of the method 400 may be implemented in differing order than described. For example, the outlined functions and operations are only provided as examples, and some of the functions and operations may be optional, combined into fewer functions and operations, or expanded into additional functions and operations without detracting from the essence of the disclosed embodiments. In some embodiments, the method 400 may include additional blocks or fewer blocks.

Figure 5:
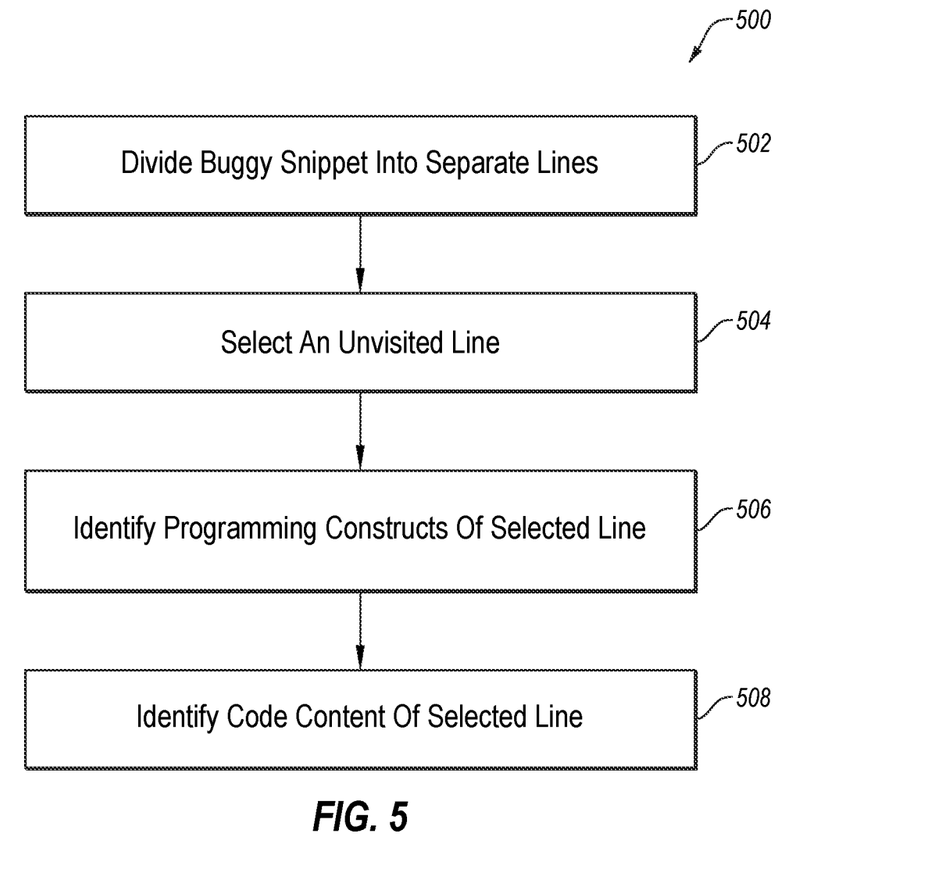
FIG. 5 is a flowchart of an example method of identifying constructs and content of lines of a code snippet.

FIG. 5 is a flowchart of an example method 500 of identifying constructs and content of lines of a buggy code snippet ("buggy snippet"), according to at least one embodiment described in the present disclosure. The method 500 may be performed by any suitable system, apparatus, or device. By way of example, the analysis module 112 of FIG. 1 or the computing system 202 of FIG. 2 (e.g., as directed by the analysis module in some embodiments) may perform one or more of the operations associated with the method 500. Although illustrated with discrete blocks, the steps and operations associated with one or more of the blocks of the method 500 may be divided into additional blocks, combined into fewer blocks, or eliminated, depending on the particular implementation.

In general, the method 500 may be performed with respect to a buggy snippet of a question posted on a developer forum (e.g., the developer forum 102 of FIG. 1). The method 500 may be used to identify elements of the lines of the buggy snippet that relate to constructs of the lines or content of the lines.

At block 502, the buggy snippet may be divided into the separate lines such that each line may be analyzed individually. At block 504, an unvisited line may be selected. An "unvisited" line may be any line of the buggy snippet that has not yet been analyzed to identify the content or construct elements of the line.

At block 506, programming constructs ("constructs") of the line selected at block 504 may be identified. As indicated above, the constructs may include those code elements that relate to and/or indicate the type of operation that is being performed at the selected line. The constructs may be identified using any suitable technique. In some embodiments, the selected line may be annotated such that the elements identified as corresponding to constructs may be indicated as such.

At block 508, programming content ("content") of the line selected at block 504 may be identified. As indicated above, the content may include those code elements that are used to perform the operations of the selected line. The content may be identified using any suitable technique. In some embodiments, the selected line may be annotated such that the elements identified as corresponding to content may be indicated as such.

One skilled in the art will appreciate that, for this and other processes, operations, and methods disclosed herein, the performance of the functions and/or operations of the method 500 may be implemented in differing order than described. For example, the outlined functions and operations are only provided as examples, and some of the functions and operations may be optional, combined into fewer functions and operations, or expanded into additional functions and operations without detracting from the essence of the disclosed embodiments. In some embodiments, the method 500 may include additional blocks or fewer blocks.

Figure 6:
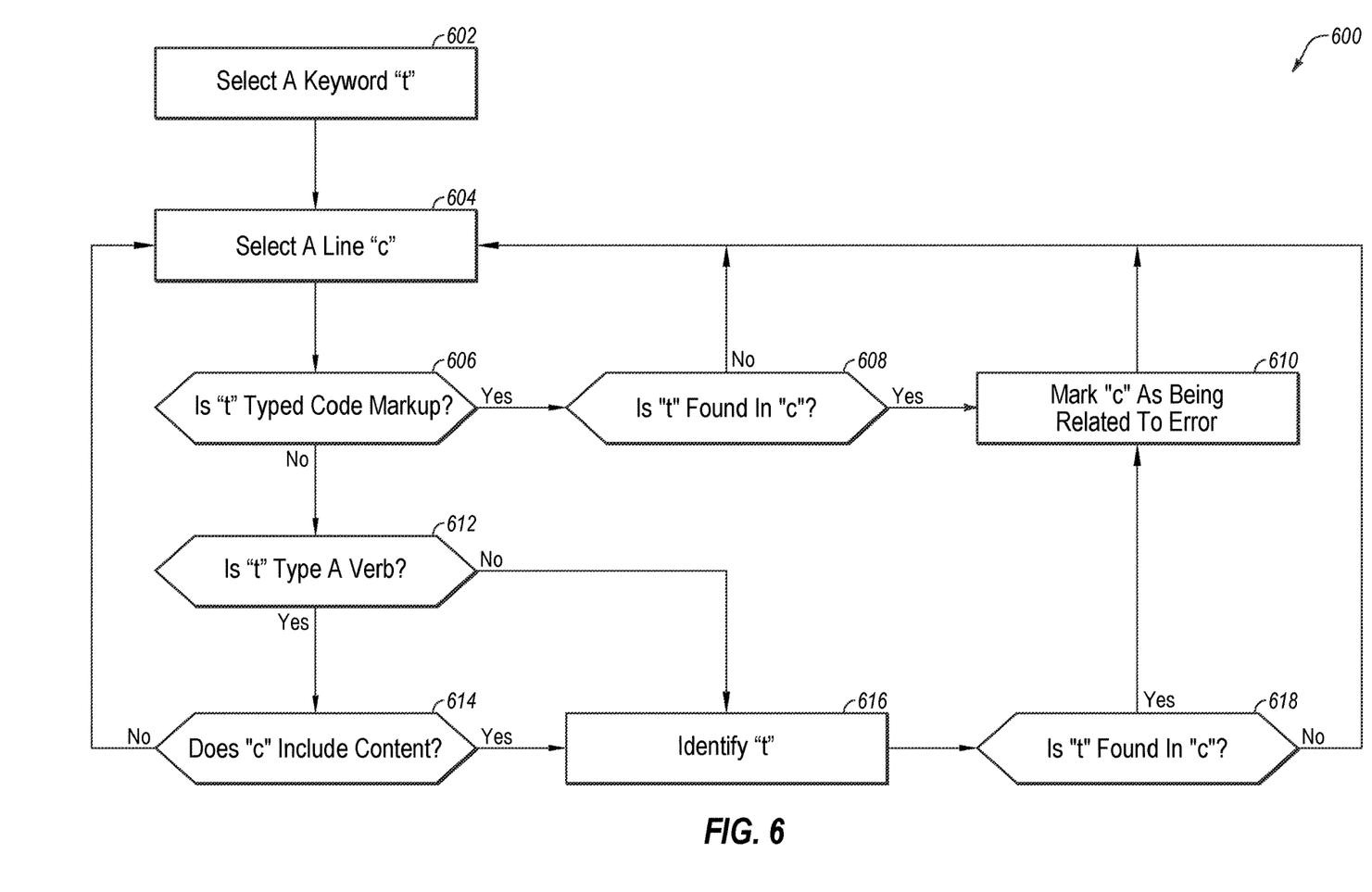
FIG. 6 is a flowchart of an example method of identifying lines of a buggy code snippet that are related to an error of the buggy snippet.

FIG. 6 is a flowchart of an example method 600 of identifying lines of a buggy code snippet ("buggy snippet") that are related to an error of the buggy snippet, according to at least one embodiment described in the present disclosure. The method 600 may be performed by any suitable system, apparatus, or device. By way of example, the analysis module 112 of FIG. 1 or the computing system 202 of FIG. 2 (e.g., as directed by the analysis module in some embodiments) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation. In some embodiments, one or more of the operations of the method 600 may be performed with respect to block 308 of the method 300 of FIG. 3.

At block 602, a keyword "t" may be selected. The keyword may be selected from answer text of an answer posted on a developer forum. In some embodiments, the keyword "t" may be selected from a list of keywords that have been extracted from the answer text. Additionally or alternatively, the keyword "t" may be selected from the answer text based on the keyword "t" being indicated as being such in an annotated version of the answer text, which may be annotated according to one or more operations of the method 400 of FIG. 4.

In some embodiments, the keyword type of the keyword "t" may also be determined. For example, it may be determined whether the keyword "t" is code markup, a noun, or a verb. In these or other embodiments, the keyword type may be determined according to one or more operations of the method 400. Additionally or alternatively, the keywords may include annotations that indicate the keyword type "t". The keyword type annotations may be included with the list of keywords and/or the annotations of the answer text.

At block 604, a line of code "c" ("line c") may be selected. The line "c" may be selected from the buggy snippet. The buggy snippet may be included in a question post of the developer forum. The answer from which the keyword "t" may be selected may be an answer to the question of the question post that includes the buggy snippet. In some embodiments, the line "c" may include annotations that indicate which elements of the line "c" correspond to code constructs and which correspond to code content. In some embodiments, the line "c" may be annotated according to one or more operations of the method 500 of FIG. 5. In some embodiments, the operations of blocks 602 and 604 may be performed in differing order and/or concurrently.

At blocks 606, 608, 610, 612, 614, 616, and 618, one or more operations may be performed to determine whether the keyword "t" corresponds to the line "c" by performing one or more comparisons based on the keyword "t" and the elements of the line "c." In some embodiments, and as explained in detail below, the operations of blocks 606, 608, 610, 612, 614, 616, and 618 may use the keyword type of the keyword "t" and/or the designation of the elements of the line "c" as corresponding to code constructs or code content to help facilitate and/or improve the speed of the determinations and comparisons. However, in some embodiments, the use of keyword types and/or the designations may not be utilized.

For example, at block 606, it may be determined whether the keyword type of the keyword "t" is code markup. In response to the keyword type being code markup, the method 600 may proceed from block 606 to block 608.

At block 608, it may be determined whether the keyword "t" is included in the line "c." For example, the keyword "t" may be compared against the elements (e.g., text) in the line "c" to determine whether the keyword "t" matches or is similar to any of the elements. In response to the keyword "t" matching or being similar to at least one of the elements of the line "c", the method 600 may proceed to block 610. At block 610, the line "c" may be marked as being related to the error of the buggy snippet. Following block 610, the method 600 may return to block 604. Further, in response to the keyword "t" not matching or being similar to at least one of the elements of the line "c", the method 600 may proceed from block 608 to block 604. At block 604 another line of code of the buggy snippet may be selected to determine whether the keyword "t" relates to the other line of code of the buggy snippet.

Returning to block 606, in response to the keyword type of the keyword "t" not being code markup, the method 600 may proceed from block 606 to block 612. At block 612, it may be determined whether the keyword type of the keyword "t" is a verb. In response to the keyword type being a verb, the method 600 may proceed from block 612 to block 614.

Often verbs correspond to code content but not code constructs. Therefore, to improve efficiency of the method 600 rather than comparing verbs against all of the elements of the line "c" verbs may be compared only against elements that correspond to code content. As such, in some embodiments, at block 614, it may be determined whether the line "c" includes code content. For example, it may be determined whether one or more elements of the line "c" correspond to code content. In some embodiments, the annotations of the line "c" may be used to determine whether the line "c" includes code content. In response to a determination that the line "c" does not include code content, the method 600 may proceed from block 614 back to block 604 for selection of another line of code for comparing with respect to the keyword "t".

In response to a determination that the line "c" does include code content, the method 600 may proceed from block 614 to block 616. At block 616 a code element "t" that corresponds to the keyword "t" may be identified. The code element "t" may be an element of code that is often associated with the natural language keyword "t". In some embodiments, the code element "t" may be identified from a lookup dictionary that includes associations between natural language words and code elements. Following block 616, the method 600 may proceed to block 618.

At block 618, it may be determined whether the line "c" includes the code element "t" identified at block 616. For example, the code element "t" may be compared against the elements (e.g., text) in the line "c" to determine whether the code element "t" matches or is similar to any of the elements of the line "c". In instances in which the keyword type is a verb, the comparison may be limited to those elements that correspond to code content, which may improve the efficiency of the method 600 in some instances.

In response to the code element "t" matching or being similar to at least one of the elements of the line "c", the method 600 may proceed to block 610. As indicated above, at block 610, the line "c" may be marked as being related to the error of the buggy snippet. As also mentioned above, following block 610, the method 600 may return to block 604. Further, in response to the code element "t" not matching or being similar to at least one of the elements of the line "c", the method 600 may proceed from block 608 to block 604. As indicated above, at block 604 another line of code of the buggy snippet may be selected to determine whether the keyword "t" relates to the other line of code of the buggy snippet.

Returning to block 612, in instances in which the keyword types are verbs, nouns, or code markup, the keyword "t" may be a noun. Nouns may correspond to code content or code constructs, therefore, in some embodiments, operations related to whether the line "c" includes content may be omitted in such instances. As such, in response to the keyword type of the keyword "t" not being a verb at block 612 (and as determined from block 606, not being code markup), the method 600 may proceed from block 612 to block 616.

The operations of the method 600 may thus be performed to determine which lines of the buggy snippet correspond to the keyword "t" and are accordingly marked as being related to the error of the buggy snippet. In some embodiments, one or more of the operations of the method 600 may be performed with respect to every keyword of the answer text and in which each respective keyword is analyzed with respect to every line of the buggy snippet.

One skilled in the art will appreciate that, for this and other processes, operations, and methods disclosed herein, the functions and/or operations performed with respect to the method 600 may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. Further, in some embodiments, the method 600 may include additional blocks or fewer blocks.

For example, the specific order and flow of the method 600 with respect to the keyword types is merely an example and many different implementations may be used as far as whether to first determine whether the keyword type is markup or a verb or a noun. Further, as indicated above, use of annotations regarding code content or code constructs may be omitted in some implementations. Additionally or alternatively, the differentiation between two or more keyword types and the use thereof may be omitted. For example, the differentiation between nouns and verbs may be omitted in some embodiments.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining a buggy code snippet from a question included in a post of a discussion forum, the buggy code snippet including an error and a plurality of lines of code;
   obtaining text from an answer to the question;
   identifying keywords from the text;
   marking one or more particular lines of the plurality of lines as being related to the error based on one or more of the keywords corresponding to one or more respective elements of each of the one or more particular lines;
   pruning the buggy code snippet based on the marking of the one or more particular lines in which lines that are not marked as being related to the error are removed; and
   performing one or more software program repair operations based on the pruned buggy code snippet, the one or more software program repair operations including generating a repair patch based on the pruned buggy code snippet.

2. The method of claim 1, wherein determining that a particular keyword corresponds to one or more of the respective elements of the one or more particular lines in response to the particular keyword matching one or more of the respective elements.

3. The method of claim 1, further comprising:
   identifying a particular code element from an association dictionary that is associated with a particular keyword; and
   determining that the particular keyword corresponds to one or more of the respective elements of the one or more particular lines in response to the particular code element matching the one or more respective elements of the one or more particular lines.

4. The method of claim 1, further comprising:
   annotating each respective line of the plurality of lines of the buggy code snippet to indicate features of respective elements of the respective line; and
   determining whether a particular keyword corresponds to one or more of the respective elements of the one or more particular lines based on a relationship between a keyword type of the particular keyword and the features of the respective elements as indicated by the annotating.

5. The method of claim 4, wherein the features of the respective elements include constructs related to operations being performed by the respective elements and content related to respective elements used in performance of the operations.

6. The method of claim 1, wherein each of the keywords is a text string of one or more characters of the text and wherein identifying a particular keyword from the text includes identifying, as the particular keyword, a particular text string that is a type that is included in a set of keyword types.

7. The method of claim 6, wherein the set of keyword types includes a code markup, a noun, and a verb.

8. One or more non-transitory computer-readable storage media configured to store instructions that, in response to being executed, cause a system to perform operations, the operations comprising:
   obtaining a buggy code snippet from a question included in a post of a discussion forum, the buggy code snippet including an error and a plurality of lines of code;
   obtaining text from an answer to the question;
   identifying keywords from the text;
   marking one or more particular lines of the plurality of lines as being related to the error based on one or more of the keywords corresponding to one or more respective elements of each of the one or more particular lines;
   pruning the buggy code snippet based on the marking of the one or more particular lines in which lines that are not marked as being related to the error are removed; and
   performing one or more software program repair operations based on the pruned buggy code snippet, the one or more software program repair operations including generating a repair patch based on the pruned buggy code snippet.

9. The one or more non-transitory computer-readable storage media of claim 8, wherein determining that a particular keyword corresponds to one or more of the respective elements of the one or more particular lines in response to the particular keyword matching one or more of the respective elements.

10. The one or more non-transitory computer-readable storage media of claim 8, wherein the operations further comprise:
    identifying a particular code element from an association dictionary that is associated with a particular keyword; and
    determining that the particular keyword corresponds to one or more of the respective elements of the one or more particular lines in response to the particular code element matching the one or more respective elements of the one or more particular lines.

11. The one or more non-transitory computer-readable storage media of claim 8, wherein the operations further comprise:
    annotating each respective line of the plurality of lines of the buggy code snippet to indicate features of respective elements of the respective line; and
    determining whether a particular keyword corresponds to one or more of the respective elements of the one or more particular lines based on a relationship between a keyword type of the particular keyword and the features of the respective elements as indicated by the annotating.

12. The one or more non-transitory computer-readable storage media of claim 11, wherein the features of the respective elements include constructs related to operations being performed by the respective elements and content related to respective elements used in performance of the operations.

13. The one or more non-transitory computer-readable storage media of claim 8, wherein each of the keywords is a text string of one or more characters of the text and wherein identifying a particular keyword from the text includes identifying, as the particular keyword, a particular text string that is a type that is included in a set of keyword types.

14. The one or more non-transitory computer-readable storage media of claim 13, wherein the set of keyword types includes a code markup, a noun, and a verb.

15. A system comprising:
   one or more processors; and
   one or more non-transitory computer-readable storage media configured to store instructions that, in response to being executed by the one or more processors, cause the system to perform operations, the operations comprising:
      obtaining a buggy code snippet from a question included in a post of a discussion forum, the buggy code snippet including an error and a plurality of lines of code;
      obtaining text from an answer to the question;
      identifying keywords from the text;
      marking one or more particular lines of the plurality of lines as being related to the error based on one or more of the keywords corresponding to one or more respective elements of each of the one or more particular lines;
      pruning the buggy code snippet based on the marking of the one or more particular lines in which lines that are not marked as being related to the error are removed; and
      performing one or more software program repair operations based on the pruned buggy code snippet, the one or more software program repair operations including generating a repair patch based on the pruned buggy code snippet.

16. The system of claim 15, wherein determining that a particular keyword corresponds to one or more of the respective elements of the one or more particular lines in response to the particular keyword matching one or more of the respective elements.

17. The system of claim 15, wherein the operations further comprise:
   identifying a particular code element from an association dictionary that is associated with a particular keyword; and
   determining that the particular keyword corresponds to one or more of the respective elements of the one or more particular lines in response to the particular code element matching the one or more respective elements of the one or more particular lines.

18. The system of claim 15, wherein the operations further comprise:
   annotating each respective line of the plurality of lines of the buggy code snippet to indicate features of respective elements of the respective line; and
   determining whether a particular keyword corresponds to one or more of the respective elements of the one or more particular lines based on a relationship between a keyword type of the particular keyword and the features of the respective elements as indicated by the annotating.

19. The system of claim 18, wherein the features of the respective elements include constructs related to operations being performed by the respective elements and content related to respective elements used in performance of the operations.

20. The system of claim 15, wherein each of the keywords is a text string of one or more characters of the text and wherein identifying a particular keyword from the text includes identifying, as the particular keyword, a particular text string that is a type that is included in a set of keyword types.

* * * * *